United States Patent Office 3,536,666
Patented Oct. 27, 1970

3,536,666
POLYAMIDE-ACID AND POLYIMIDES PREPARED FROM AROMATIC DIAMINES CONTAINING AT LEAST TWO TETRAARYLMETHANE NUCLEI
Carl John Berg, St. Paul, Minn., assignor to Minnesota Mining and Manufacturing Company, St. Paul, Minn., a corporation of Delaware
No Drawing. Continuation-in-part of application Ser. No. 568,128, July 27, 1966. This application Nov. 29, 1968, Ser. No. 780,281
Int. Cl. C08g 20/32
U.S. Cl. 260—47
21 Claims

ABSTRACT OF THE DISCLOSURE

Polyamide-acid resins and corresponding polyimides are formed from aromatic tetracarboxylic anhydrides and aromatic diamines containing at least two tetraarylmethane nuclei joined by —S—, —O—, —NH— or —CH$_2$— linking radicals. These polyimides have significant solubility in certain solvents whereby they can be fabricated into films and the like.

This application is a continuation-in-part of prior application Ser. No. 568,128, filed July 27, 1966, and now abandoned.

This invention relates to novel polymeric materials and more particularly to a certain new group of curable polyamic acids and to the polyimides produced therefrom.

The formation of polyamide-acids by the reaction of organic diamines and aromatic tetracarboxylic acid anhydrides is well known. Compounds of this type have been disclosed in U.S. Pats. Nos. 3,179,614; 3,179,634 and 3,190,956. Likewise, further curing of these polyamide-acids to form polyimides of highly useful characteristics has previously been described, for example in U.S. Pats. 3,179,633 and 3,179,634, as well as in U.S. Pat. 3,190,856.

In the United States patents mentioned, many aromatic diamines and aromatic tetracarboxylic acid anhydrides are described, together with the methods for their reaction to form polyamide acids, and methods for converting the polyamide-acids to polyimides. From these patents, it will be understood that aromatic tetacarboxylic acid anhydrides readily react with aromatic diamines, in which the amino groups are primary amino groups. The initial stage of the reaction brings about the formation of a polyamide-acid, which is a polymer which is soluble in at least a few organic solvents such as dimethylformamide and the like, and which can be formed into the desired shapes by virtue of its solubility.

After forming shaped articles, these are converted to the polyimide state by heat treatment or chemical treatment.

The polyimides formed from the polyamide-acids known in the prior art are extremely stable structures which are of extremely low solubility, ordinarily being substantially insoluble in all known organic solvents and only slightly soluble in such materials as concentrated sulfuric acid and the like. Even materials of quite low molecular weight are apparently completely insoluble in all known solvents. Only in special instances, where trifluoromethyl groups are present in the polymer, has solubility in organic solvents been observed, and this has been of such nature as to tend to detract from the other advantages of the polyimide.

In one aspect, this invention visualizes the formation of polyamide-acids from tetracarboxylic anhydrides and diamines containing two primary amino groups attached to a residue containing not fewer than 8 benzenoid rings, arranged in tetraaryl methane configuration.

In another aspect of the invention, the polyamide-acids embodying the multi-benzenoid ring residues are converted to polyimides having extremely interesting and useful properties.

In accordance with the above and other objects of the invention, it has been found that polyamide-acids having recurrent units of the formula

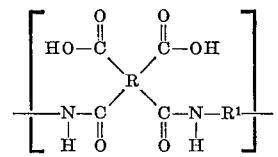

wherein R is a tetravalent radical containing at least one ring of 6 carbon atoms, said ring characterized by benzenoids unsaturation, the four carbonyl groups being attached directly to separate carbon atoms in a ring of the R radical and each pair of carbonyl groups being attached to adjacent carbon atoms in a ring of the R radical; R$^1$ in said formula being a divalent radical having the formula

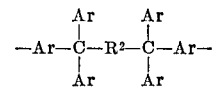

wherein Ar is an aromatic moiety free from aromatic substituents having a Hammett sigma value less than +0.2, and R$^2$ is an aromatic moiety containing at least 2 aromatic rings, each of which is bonded directly to one of the carbon atoms shown in the formula; and provided further that the sum of Hammett sigma values of the substituents on each of the 2 required rings in R$^2$ is no greater than zero, and the sum of the Hammett sigma values of the substituents of any additional ring in R$^2$ is greater than +0.2, are formed by the reaction of a tetracarboxylic anhydride of the formula

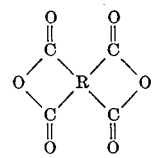

with a diamine represented by the formula

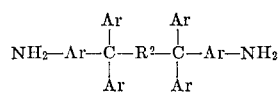

wherein R, R$^2$ and Ar have the same significance as hereinabove.

The diamines according to the formula above are compounds which are prepared by the reaction of a halogenated diarylmethane, e.g. dichlorodiphenyl methane, with an aromatic compound, e.g. diphenyl ether, to form p,p'-bis(chlorodiphenylmethyl)diphenyl ether. This product is caused to react with an aryl amine, e.g. aniline, to form bis(p-aminotetraphenylmethane)ether.

The Hammett sigma values are characteristic of substituent groups on aromatic rings and are a measure of the electronegativity of the group. A review of the subject is contained in an article by H. Jaffe, Chem. Rev. 53, 191 (1953) which is incorporated herein by reference. As referred to herein, a Hammett sigma value of zero is greater than −0.2, and a value of +0.2 is greater than zero. Common substituents which can be present include chlorine, hydroxyl and the like substituents.

Normally these intermediate diamines contain not more than 98 carbon atoms and they can contain as few as 48 carbon atoms. Preferably they are entirely aromatic, except for the completely aryl-substituted methane atoms. The aromatic rings in the Ar and Ar' groups therein can include nitrogen hetero atoms but ordinarily they contain only carbocycles. These cyclic groups preferably contain not more than 10 carbon atoms each and more often contain only 6 carbon atoms. The $R^2$ group usually contains not more than 24 carbon atoms. The two required rings in $R^2$ can, for example, be bonded together through —O—, —S—, —CH$_2$—, —NH— or they can be doubly bonded together by a member of the class —O—, —S—, and a carbon-carbon bond and by a member of the class —O—, —S— and —CH$_2$—.

In general, the reactions to form the intermediate diamines can be characterized as follows:

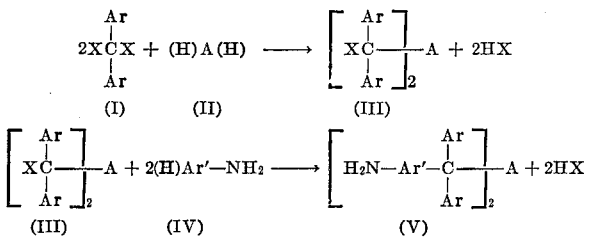

wherein Ar is an aromatic moiety containing no aromatic substituent having a Hammett sigma ($\sigma$) value less than +0.2, Ar' is an aromatic moiety having no substituents other than Y and Q, A is an aromatic moiety containing at least two aromatic rings, each of which is bonded directly to one of the carbon atoms shown, X is chlorine or bromine and (H) is a replaceable aromatic hydrogen atom.

The first step in this process, i.e. the preparation of compounds of type III, is carried out in a solution using a suitable inert solvent, such as carbon disulfide or tetrachloroethylene, at a temperature ranging from about 40 to 150° C. in the presence of a condensation catalyst. Effective catalysts for this reaction are anhydrous Lewis acids (also known as Friedel-Crafts Catalysts) such as aluminum chloride, aluminum bromide, ferric chloride, antimony pentachloride, molybdenum pentachloride, indium trichloride, gallium trichloride, etc.

The first halogen atom is removed from compound I quite easily in its reaction with II to form III. Once III is formed, however, the reaction stops since compounds of this type are quite stable. When the preferred catalyst, aluminum chloride, is used, a stable complex is formed between the product (compound III) and the aluminum chloride. This complex can be decomposed with water and the desired product isolated.

In the final step of the process, the remaining halogen (X) is removed, utilizing the more reactive compound IV. This step is carried in either a melt or a solution and ordinarily at a temperature ranging from 100 to 200° C. A catalyst is generally not needed although a conednsation catalyst (such as those listed above) is desirable in some cases. An inert solvent, such as tetrachloroethylene, or an organic carboxylic acid, such as acetic acid or propionic acid, can also be utilized.

Among the specific intermediate compounds useful in preparing the compounds of the invention are the following:

(I) Diphenyl dichloromethane, diphenyl dibromomethane, p,p'-dichlorodiphenyl dichloromethane, m-trifluoromethylphenyl phenyldichloromethane, 2,4-dichlorophenyl phenyldichloromethane and 2,4-dibromophenyl phenyldichloromethane.

(II) Diphenyl ether, diphenyl thioether, diphenyl amine and diphenyl methane, as well as compounds of the formula:

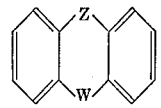

wherein Z is a member of the group consisting of —O—, —S— and a carbon-carbon valence bond and W is a member of the group consisting of —O—, —S— and —CH$_2$—. Moieties exemplified by the latter formula include dibenzofuran, fluorene, xanthene, dibenzothiophene, dibenzo-1,4-thioxane, and the like.

(IV) o-Aminophenol, aniline, o-phenylene diamine, o-aminothiophenol, α-naphthylamine, β-naphthylamine, etc.

These intermediates are specifically illustrated by examples showing the best mode presently contemplated of practicing the invention. In these examples, where not otherwise indicated, parts of solids are by weight and of liquids by volume and temperatures are in degrees centigrade.

EXAMPLE 1

The preparation of bis-trityl chloride) ether.

A 5-liter flask fitted with a stirer, thermometer, and a condenser is charged with benzophenone dichloride (471.4 g., 1.97 mole), diphenyl ether (169.0 g., 0.99 mole), and 2 liters of tetrachloroethylene. The solution is cooled to 10° and AlCl$_3$ (268.0 g., 1.97 mole) is added at such a rate that the temperature does not exceed 17°. The cooling bath is removed and the mixture is slowly warmed to reflux and maintained at this temperature until the evolution of gas ceases.

The mixture is then cooled to 25° and divided into five portions. Each portion is mixed with 80 ml. of water and beaten in a blendor until a white color appears. The material is then filtered and the organic filtrates are combined. Hexane (400 ml.) is added and the solution is cooled and allowed to stand for 2 hours. The material is then filtered; the filter cake is washed with hexane and dried to give 357 g. (62.7%) of a white product, M.P. 173–175° C.

In a second preparation of the same compound, a white product melting at 175–177° C. is obtained. Analytical results on this material are as follows:

Calculated for $C_{39}H_{29}OCl_2$ (percent): C, 79.8; H, 4.9; Cl, 12.9. Found (percent): C, 80.2; H, 5.1; Cl, 12.3.

Example 2

The preparation of bis-(p-aminophenyltriphenylmethane) ether.

A 100 ml. flask fitted with a magnetic stirrer, thermometer, and a condenser, is charged with bis-(tritylchloride) ether (11.4 gr., 0.02 mole), aniline hydrochloride (13.0 g., 0.1 mole), and 50 ml. of acetic acid. The resulting thick slurry is heated to reflux and maintained at this temperature until the theoretical quantity of HCl is evolved. The material is filtered; the filter cake is washed free of mother liquor with acetic acid; and dried to give 11.9 g. (79%) of a purple product, M.P. 244–250°.

The amine hydrochloride is converted to the free amine by suspending the salt in aqueous methanol and treating with methanolic sodium hydroxide. The white amine is filtered and dried, M.P. 301–304°. This diamine, despite its high melting point, is readily soluble in tetrahydrofuran and dioxane.

*Analysis.*—Calculated: N.E. 343. Found: N.E. 351.

In a similar manner, additional intermediate diamines shown below are prepared (the reactants and products being designated by Roman numerals as hereinbefore).

The tetracarboxylic anhydrides which are used in preparing the compounds of the invention are well known to the art. They include the tetracarboxylic acid dianhydrides set forth in, e.g. the United States patent No. 3,179,634, noted hereinabove. More readily available, and therefore preferred, tetracarboxylic acid di-

| Ex. No. | I | II | IV | V |
|---|---|---|---|---|
| 3 | 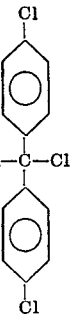 | 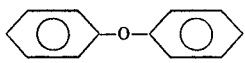 | 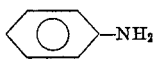 | 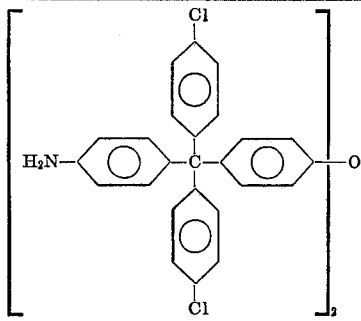 |
| 4 | 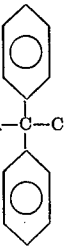 | 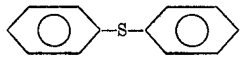 | Same | 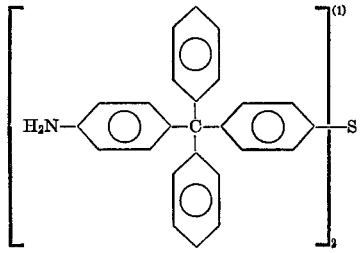 |
| 5 | Same | 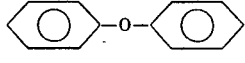 | 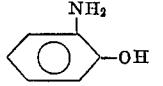 | 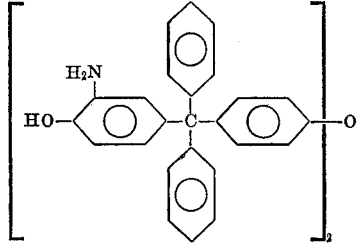 |
| 6 | 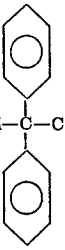 | 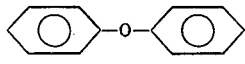 | 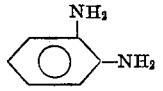 | 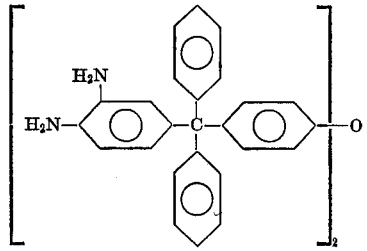 |
| 7 | Same | 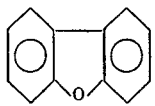 | 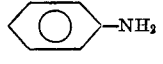 | 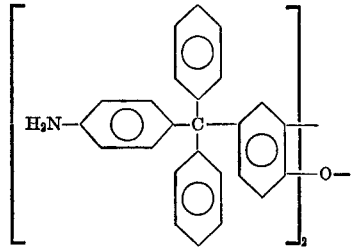 |
| 8 | Same | 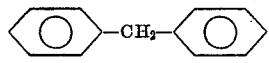 | Same | 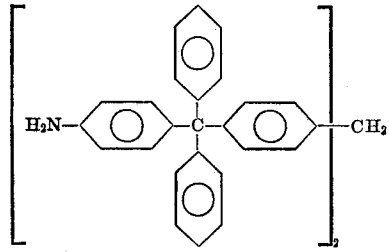 |

[1] Melting point 223–225° C.

anhydrides of this type are pyromellitic dianhydride, 3,4,3',4' - diphenyltetracarboxylic dianhydride, 2,2 - bis (3,4-dicarboxyphenyl)propane dianhydride, 3,4,3',4'-benzophenone tetracarboxylic dianhydride, azobenzene tetracarboxylic acid dianhydride and the like. Another tetracarboxylic anhydride of special interest is 3,4,3',4'-diphenyl ether tetracarboxylic dianhydride.

The polyamide-acids described by the general formula set forth above can be concerted to polyimides having recurring units of the general formula

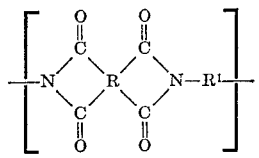

wherein R and R¹ have the significance set forth hereinabove.

For effecting this conversion, the polyamide-acids are heated above 50° C. to convert pairs of amide and carboxylic acid groups to imide groups, by removal of hydrogen and —OH, respectively, therefrom, probably in the form of H₂O. Heating may be conducted for varying periods ranging from a few seconds to several hours. Temperatures ranging up to 150° C. are suitable, and even higher temperatures may be employed if desired.

Chemical means can be used to remove the hydrogen and —OH groups from the polyamide-acid intermediate polymer. This involves treating the polyamide-acid composition with a dehydrating agent, either alone or in combination with a tertiary amine. Thus a preshaped polyamide-acid article can be treated in a bath containing, e.g. acetic anhydride and pyridine.

Other methods of dehydrating the polyamide-acid to cyclize the carboxyl group and amide group to form a polyimide can be employed.

A particularly preferred group of polyamide-acids, and resulting polyimides, is that which is formed when R¹ in the above-identified formulae has the structure

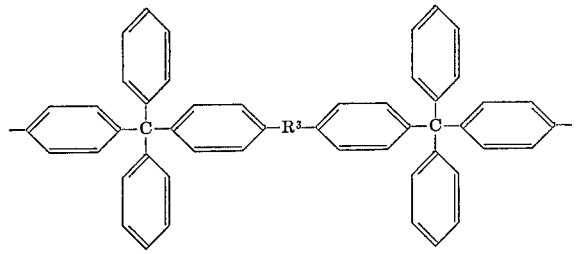

in which R³ is a linking radical of the group consisting of —O—, —S—, —CH₂— or —NH—, and R in the said formula has the formula

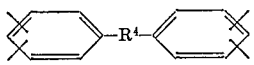

wherein R⁴ is a linking radical of the class consisting of —O—, —CH₂—, —N=N— or —CO—.

The polyamide-acids of the invention are soluble in certain organic solvents, such as dimethyl formamide, dimethyl acetamide, tetramethylurea, N-methylpyrrolidone and dimethylsulfoxide. They can be isolated from such solutions by precipitating by the use of methanol, water and the like. The resulting granular material can be molded, or re-dissolved in a suitable solvent, to form a film-forming or varnish type composition. Other appropriate compositions, including fillers, dyes, coloring agents, pigments, etc. can be used to make intermediate uncured polyamide-acid structures in the usual way. These are then usefully cured by the method set forth above.

The polyamides produced according to this invention, and particularly the preferred group of polyamides, are characterized by useful solubility in certain organic solvents. So far as is known, polyamides heretofore known to the art have generally been extremely insoluble, and have not been shapeable after conversion from the polyamide-acid state to the polyimide form. The polyimides of the invention are extremely useful in that they can be dissolved in certain solvents, in relatively high concentration, and the solutions can be employed for further fabrication of the polyimides. In this way, it is possible to produce polyimide films, coatings and the like without the necessity for using a polyamide-acid intermediate with a follow-on converting step. This is highly advantageous, because it permits the use of polyimide coatings on articles which might be damaged by heating or chemical conversion techniques heretofore necessary.

Solvents in which a number of the novel polyimides of the invention are soluble include methylene chloride, tetrahydrofuran and chloroform. These polyimides are not soluble in carbon tetrachloride, trichloroethylene, acetone, gasoline, perchloroethylene, ethanol, xylene, benzene, toluene or the like, even when hot. As will be seen from the enumerated solvents, the polyimides of the invention, while usefully soluble, are not affected by many common solvents and therefore are very useful in applications where resistance to such solvents is required.

Where certain heretofore known polyimides having trifluoromethyl substituents have been found to be soluble, these are believed to be soluble in so many common organic solvents as to have limited usefulness, e.g. as coatings.

The polyimides of the invention are infusible, thermally resistant materials which are useful as surface coatings, for impregnation of glass or other fibers for laminating sheets of metal, cloth, paper, etc. They are strong and flexible and can be fabricated into various forms including filaments and molded products as well as self-supporting films.

The following examples, in which all parts are by weight unless otherwise specified, will more particularly describe the preparation of the new polyimides of the invention and various other embodiments of the invention. It is to be understood that these are not restrictive in any manner.

EXAMPLE 9

Preparation of a polyimide from bis-(4-aminotetraphenyl methane)ether and pyromellitic dianhydride.

The apparatus employed and the techniques used were those consistent with maintaining the reaction mixture in driest (i.e. water-free) conditions. To a three-necked vessel provided with a paddle stirrer, dry nitrogen inlet and protected exit were added the following, while maintaining a nitrogen atmosphere:

| | G. |
|---|---|
| Bis-(4-aminotetraphenyl methane)ether | 3.505 |
| Pyromellitic dianhydride | 0.446 |
| Dimethyl acetamide (dried) | 17.65 |

The resulting solution, containing 10 percent solids by weight, was stirred for about 2.5 hours at 20° C. The mixture was then permitted to stand for about 65 hours at room temperature. At that time, the viscosity of the polyamide-acid resulting from the reaction was measured, and the inherent viscosity was found to be 0.25 (concentration in dimethyl acetamide=1 percent).

Two ml. of the polyamide-acid solution thus obtained were uniformly coated on a 4 x 4 inch plate of glass, and the dimethyl acetamide was evaporated in vacuo at about 35–40° C. The thin, clear, colorless film thus obtained was stripped from the glass surface and clamped in a restraining frame. While so clamped, the film was heated to 200° F. for one hour, 300° F. for one hour, and 500° F. for one hour. The film was pale tan in color, and somewhat brittle. Infrared analysis confirmed that the material was a polyimide. The film thus prepared was readily soluble in cold methylene chloride.

EXAMPLE 10

A polyimide was prepared from bis-(4-aminotetraphenyl methane)ether and pyromellitic dianhydride using a dry technique similar to that in Example 1, except that the pyromellitic dianhydride was weighed into a shallow polypropylene dish which was floated on the dimethyl acetamide solution of the diamine contained in a screw-capped jar with a tetrafluoroethylene liner. The whole assembly was cooled to about 10° C., and then mixed by inverting and rapid shaking.

1.715 grams of the diamine, 20.3 g. of dimethyl acetamide and 0.54 g. of pyromellitic dianhydride were employed. A slight excess of the amine was present. After shaking for two hours, the polyamide-acid resin which formed was found to have inherent viscosity=0.41 (concentration=1 percent in dimethyl acetamide).

A film of the polyamide-acid was made as in Example 1, and converted to the polyimide in the same way. The film was found to be strong, clear and could be folded on itself. The inherent viscosity of the film was 0.26 (concentration=1 percent).

The film thus produced was dissolved in cold methylene chloride to give about a 10 percent solution. The solution was used to coat a glass surface, and the solvent was evaporated with some warming. The resulting polyimide film was adherent to the glass, and resisted removal by rubbing and scratching. The glass plate and film coating were heated to about 200° C. on a hot plate. After cooling, the film still resisted removal by rubbing and scratching, but could be removed with methylene chloride as the film of polyimide was still soluble in that solvent.

EXAMPLE 11

Using dry conditions, 3.5 parts of bis-(4-aminotetraphenyl methane)ether were weighed into a container and maintained under dry nitrogen. To this were added 44.2 parts of dry dimethyl acetamide, and the solution was cooled to about 10° C. 1.09 parts of pyromellitic dianhydride were then added with vigorous stirring. After two hours, the inherent viscosity of the resulting polyamide-acid resin was 0.36 (concentration=0.5 in dimethyl acetamide).

When this solution was heated to about 250° C., the dimethyl acetamide evaporated and the polyamide-acid was converted to the polyimide. The polyimide dissolved in chloroform, and a clear solution was formed.

EXAMPLE 12

A solution was prepared by dissolving 5 g. of the polyimide prepared from bis-(4-aminotetraphenyl methane) ether and pyromellitic dianhydride produced similarly to the procedure described in Example 3 in 35 ml. of methylene chloride. This solution contained approximately 10 percent solids by weight, and was a clear, slightly yellowish, viscous solution. Aluminum, copper and titanium plates were dipped in the solution and removed, leaving a film of the polyimide solution on each. The methylene chloride was evaporated first in air, then in vacuo, heating to about 100° C. for complete removal. The coatings thus prepared were adherent to the metal sheets, somewhat less strongly in the case of aluminum. The polyimide was still soluble in methylene chloride and could be removed from the metal sheet by use of this solvent.

A similar solution containing about 20 percent solids was used for coating copper foil. The foil, about 1 mil in thickness, was dipped and the solvent removed as above. A thin film of the polyimide was formed on the foil. The foil thus coated had a uniform coating of polyimide over its surface. The coating withstood scraping and abrasion, and the foil could be bent repeatedly and withstood folding. The dielectric properties of the coating were excellent.

In a similar way copper and nichrome wires are coated with the polyimide, and a useful insulating coating is formed. For wire varnishes, a trace of a high-boiling solvent, say about 1 percent of chlorobenzene, is added to the methylene chloride solution of the polymer as a leveling agent. Superior coatings are thus obtained.

EXAMPLE 13

The procedure of Example 2 was repeated, except that 0.797 g. of azobenzene tetracarboxylic dianhydride was employed with the named amine. The amount of dimethyl acetamide used was adjusted to 20 percent solid. A clear red solution of polyamide-acid in dimethyl acetamide was obtained. Inherent viscosity was 0.41 (concentration=1 percent in dimethyl acetamide). When evaporated to dryness, followed by heating at increasing temperatures up to about 250° C., a dark red polyimide was formed. This material could be dissolved in methylene chloride. When the methylene chloride solution was cast on a glass plate and the solvent evaporated, an adherent clear red film of polyimide was obtained, which could be stripped from the plate. Strongly adherent films of this polymer were obtained when cast on copper, aluminum and titanium plates.

EXAMPLE 14

Example 5 was repeated, using 0.789 g. of benzophenone tetracarboxylic dianhydride. The inherent viscosity of the polyamide-acid was 0.34 (concentration=1 percent in dimethyl acetamide). The polyimide was soluble in chloroform, tetrahydrofuran and methylene chloride. It was also soluble in hot chlorobenzene.

When a solution (about 25 percent solids) of this polyimide in methylene chloride was coated on a 10 mil thick sheet of a copolymer of tetrafluoroethylene and hexafluoropropene (available under the trademark name "Teflon 100"), a tightly adherent coating of the polyimide was formed. This laminate was flexible and could be folded without disrupting the bond between the polymers.

Repeating this procedure with bis-(3,4-dicarboxyphenyl)ether dianhydride gives similar results.

Likewise, when the procedure of Example 5 is carried out, using, e.g. pyromellitic dianhydride and bis-(4-aminotetraphenyl methane)sulfide, or bis-(4-aminotetraphenyl methane)amine having the formula

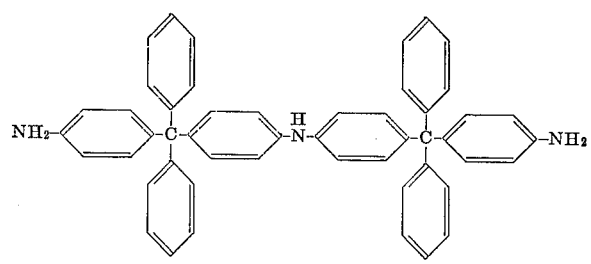

or bis-(4-aminotetraphenyl methane)methylene having the formula

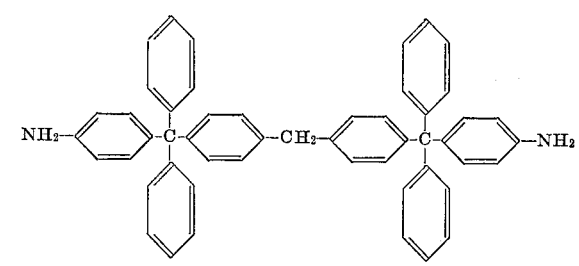

respectively, useful polyimides are formed.

EXAMPLE 15

A polyimide was prepared from bis-(4-aminotetraphenylmethane) sulfide and benzophenone tetracarboxylic dianhydride using the procedure of Example 2. A solution was prepared by weighing 5.1809 grams (0.00739 mole) of bis(4-aminotetraphenylmethane) sulfide into a wide mouth eight ounce bottle, and adding 72.21 ml. of dried dimethylacetamide. A polyethylene boat containing 2.3329 grams (0.00724 mole) of benzophenone tetracarboxylic dianhydride was floated on the diamine solution. The entire bottle and contents were then cooled in an ice-water bath for one hour. Reaction was started by violently shaking the bottle to spill the dianhydride into the diamine solution. The bottle was then shaken mechanically for one hour, removed and the resulting polyamide-acid resin solution which was formed was stored in a freezer pending further use.

The polyamide-acid resin, isolated by removal of the dimethyl acetamide, was found to have inherent viscosity of 0.27 (conc. 0.125 g. in 25 ml. of dimethyl acetamide).

An aliquot of about 25 ml. of the polyamide-acid solution was converted to the corresponding polyimide by pouring the aliquot with stirring into a rapidly agitated mixture of 190 ml. of acetic anhydride and 160 ml. of pyridine (Waring Blendor). After about one-half hour, the poly bis(4-aminotetraphenylmethane) sulfide benzophenone tetracarboxylic acid imide which had formed was precipitated by the addition of acetonitrile. The resulting solid precipitate was removed by filtration and thoroughly washed twice with acetonitrile. The solvent was removed from the solid polyimide under reduced pressure (0.5 mm./Hg) while maintaining the material at about 100° C. overnight. Thermal gravimetric analysis and differential thermal analysis of a portion of the material showed that it had a glass transition temperature of 251–275° C., 10 percent weight loss temperature of 548° C. and 50 percent weight loss temperature of 644° C. The polyimide as thus prepared was a pale yellow powder, which had useful solubility in methylene chloride.

What is claimed is:

1. Film and fiber forming polyimide consisting essentially of the recurring unit

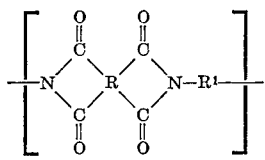

wherein R is a tetravalent radical containing at least one ring of 6 carbon atoms, said ring characterized by benzenoid unsaturation, the four carbonyl groups being attached directly to separate carbon atoms in a ring of the R radical and each pair of carbonyl groups being attached to adjacent carbon atoms in a ring of the R radical; and wherein $R^1$ is a divalent radical having the formula

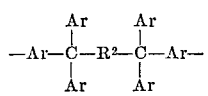

wherein Ar is an aromatic moiety free from aromatic substituents having a Hammett sigma ($\sigma$) value less than +0.2 and $R^2$ is an aromatic moiety containing at least 2 aromatic rings, each of which is bonded directly to one of the carbon atoms shown in the formula, and provided further that the sum of the Hammett sigma values of the substituents on each of the two required rings in $R^2$ is no greater than zero, and the sum of the Hammett sigma values of the substituents of any additional ring in $R^3$ is greater than +0.2.

2. A polyimide according to claim 1, wherein $R^1$ has the formula

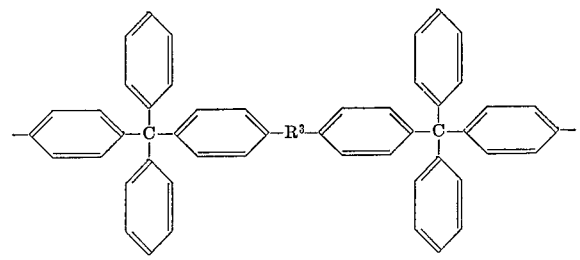

wherein $R^3$ is a linking radical of the group consisting of —O—, —S—, —CH$_2$— or —NH—.

3. A polyimide according to claim 2, in which R has the formula

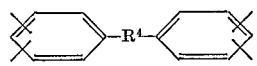

wherein $R^4$ is a linking radical of the class consisting of —O—, —N=N— or

4. A polyimide according to claim 1, wherein $R^1$ has the formula

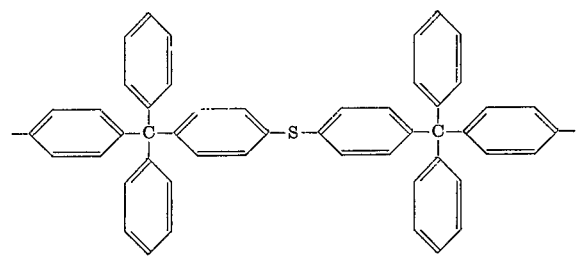

5. A polyimide according to claim 2, wherein R has the formula

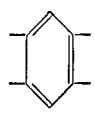

6. Film and fiber forming poly bis-(4-aminotetraphenyl methane) ether pyromellitimide.

7. Film and fiber forming poly bis-(4-aminotetraphenyl methane) sulfide pyromellitimide.

8. A film forming polyamide-acid, consisting essentially of the recurring unit

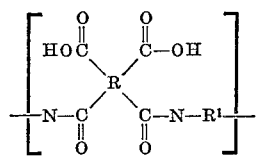

wherein R is a tetravalent radical containing at least one ring of 6 carbon atoms, said ring characterized by benzenoid unsaturation, the four carbonyl groups being attached directly to separate carbon atoms in a ring of the R radical, and each pair of carbonyl groups being attached to adjacent carbon atoms in a ring of the R radical; and wherein $R^1$ is a divalent radical having the formula

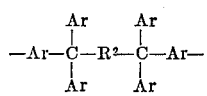

wherein Ar is an aromatic moiety free from aromatic substituents having a Hammett sigma value less than +0.2, and $R^2$ is an aromatic moiety containing at least 2 aromatic rings, each of which is bonded directly to one of the carbon atoms shown in the formula, and provided further that the sum of the Hammett sigma values of the substituents on each of the two required rings in $R^2$ is no greater than zero, and the sum of the Hammett sigma values of the substitutents of any additional ring in $R^2$ is greater than +0.2.

9. A polyamide-acid according to claim 8, wherein $R^1$ has the formula

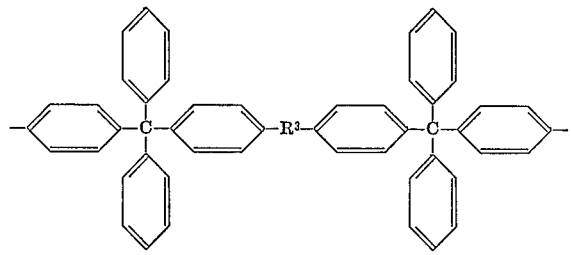

wherein $R^3$ is a linking radical of the group consisting of —O—, —S—, —CH$_2$— or —NH—.

10. A polyamide-acid according to claim 8, in which R has the formula

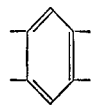

11. A film forming polyamide-acid consisting essentially of repeating units of the formula

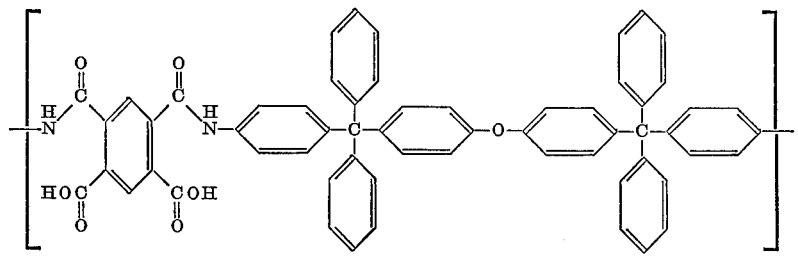

12. A film forming polyamide-acid consisting essentially of repeating units of the formula

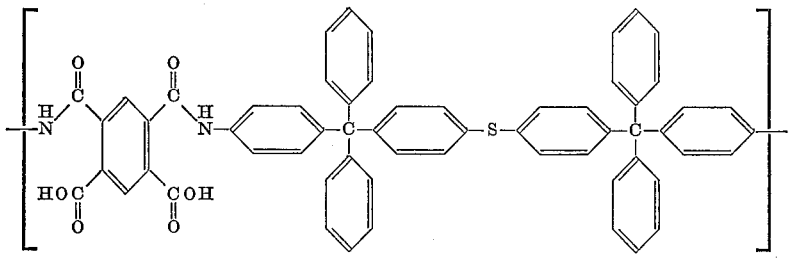

13. A solution of a polymer according to claim 1 in a volatile solvent for said polymer.

14. A solution of a polyimide according to claim 3 in a volatile solvent for said polymer.

15. A solution of poly-bis(4-aminotetraphenyl methane)ether pyromellitimide in a volatile solvent for said polymer.

16. A self-supporting film consisting essentially of at least one polyimide according to claim 1.

17. A metal article coated with at least one polyimide according to claim 1.

18. A metal article according to claim 17 coated with poly-bis (4-aminotetraphenyl methane)ether pyromellitimide.

19. An article according to claim 18 in which the metal is copper.

20. A film forming polyamide-acid consisting essentially of repeating units having the formula

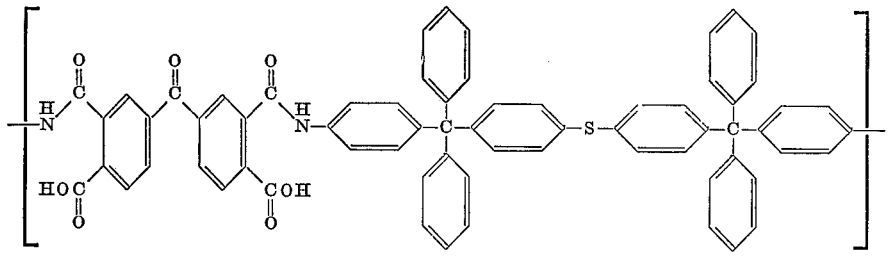

21. Film and fiber forming poly bis-(4-aminotetraphenyl methane) sulfide benzophenone tetracarboxylic acid imide.

References Cited

UNITED STATES PATENTS 3,179,614    4/1965    Edwards _____ 260—30.2
3,179,634    4/1965    Edwards _____ 260—78

WILLIAM H. SHORT, Primary Examiner

L. L. LEE, Assistant Examiner

U.S. Cl. X.R.

117—132, 161; 161—197, 214, 229; 260—78, 32.6, 33.8, 65, 30.4, 30.8, 32.4

UNITED STATES PATENT OFFICE
CERTIFICATE OF CORRECTION

Patent No. 3,536,666      Dated October 27, 1970

Inventor(s) Carl John Berg

It is certified that error appears in the above-identified patent and that said Letters Patent are hereby corrected as shown below:

Column 9, line 7, for "Example 1" read --Example 9-- .

Column 9, line 57, for "Example 3" read --Example 11-- .

Column 10, line 11, for "Example 2" read --Example 10-- .

Column 10, line 44, for "Example 5" read --Example 13-- .

Column 11, line 4, for "Example 2" read --Example 10-- .

Signed and sealed this 22nd day of June 1971.

(SEAL)
Attest:

EDWARD M. FLETCHER, JR.　　　　　　　WILLIAM E. SCHUYLER, JR.
Attesting Officer　　　　　　　　　　Commissioner of Patents